(12) United States Patent
Sakai

(10) Patent No.: US 9,860,683 B2
(45) Date of Patent: Jan. 2, 2018

(54) COMMUNICATION APPARATUS, METHOD FOR CONTROLLING COMMUNICATION APPARATUS, AND STORAGE MEDIUM

(71) Applicant: CANON KABUSHIKI KAISHA, Tokyo (JP)

(72) Inventor: Tatsuhiko Sakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 134 days.

(21) Appl. No.: 14/884,507

(22) Filed: Oct. 15, 2015

(65) Prior Publication Data

US 2016/0119579 A1    Apr. 28, 2016

(30) Foreign Application Priority Data

Oct. 22, 2014 (JP) ................. 2014-215136

(51) Int. Cl.
| | |
|---|---|
| H04W 4/00 | (2009.01) |
| H04W 76/02 | (2009.01) |
| H04L 29/08 | (2006.01) |
| H04W 84/12 | (2009.01) |

(52) U.S. Cl.
CPC ............ *H04W 4/008* (2013.01); *H04L 67/16* (2013.01); *H04W 76/026* (2013.01); *H04W 76/027* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2008/0207115 A1* | 8/2008 | Lee ............... | H04M 1/7253 455/3.06 |
| 2012/0236820 A1* | 9/2012 | Park .............. | G08C 17/02 370/331 |
| 2014/0073244 A1* | 3/2014 | Ko ................ | H04W 4/008 455/41.1 |
| 2014/0168681 A1* | 6/2014 | Nakamura ...... | G06F 3/1276 358/1.13 |
| 2014/0373123 A1* | 12/2014 | Kang ............. | H04L 41/22 726/7 |

(Continued)

FOREIGN PATENT DOCUMENTS

| | | |
|---|---|---|
| JP | 2009-207069 A | 9/2009 |
| JP | 2011-35768 A | 2/2011 |

*Primary Examiner* — Steven H Nguyen
(74) *Attorney, Agent, or Firm* — Canon U.S.A., Inc. IP Division

(57) ABSTRACT

A communication apparatus includes an acquisition unit that acquires, from another communication apparatus, information of a first service that the another communication apparatus can provide, a storage unit that stores state information indicating whether the communication apparatus is capable of providing the second service, a communication control unit that establishes a connection for data communication between the communication apparatus and the another communication apparatus for carrying out the first service or the second service, and a setting unit that sets the state information stored by the storage unit so that the state information indicates that the communication apparatus is incapable of providing the second service in response to issuance of an instruction to carry out the first service.

14 Claims, 11 Drawing Sheets

(56) References Cited

U.S. PATENT DOCUMENTS

2015/0004908 A1* 1/2015 Lee .................... H04W 76/023
                                                           455/41.1
2015/0026580 A1* 1/2015 Kang ...................... G06F 3/167
                                                           715/728

* cited by examiner

FIG.4

|  | SMARTPHONE | DIGITAL CAMERA |
|---|---|---|
| NFC TAG | PLAY | SEND |
| SEND | USE | PROVISION |
| PLAY | PROVISION | USE |

FIG.10

|  | SMARTPHONE | DIGITAL CAMERA |
|---|---|---|
| NFC TAG | PLAY | SEND |
| SEND | USE/PROVISION | PROVISION/USE |
| PLAY | PROVISION | USE |

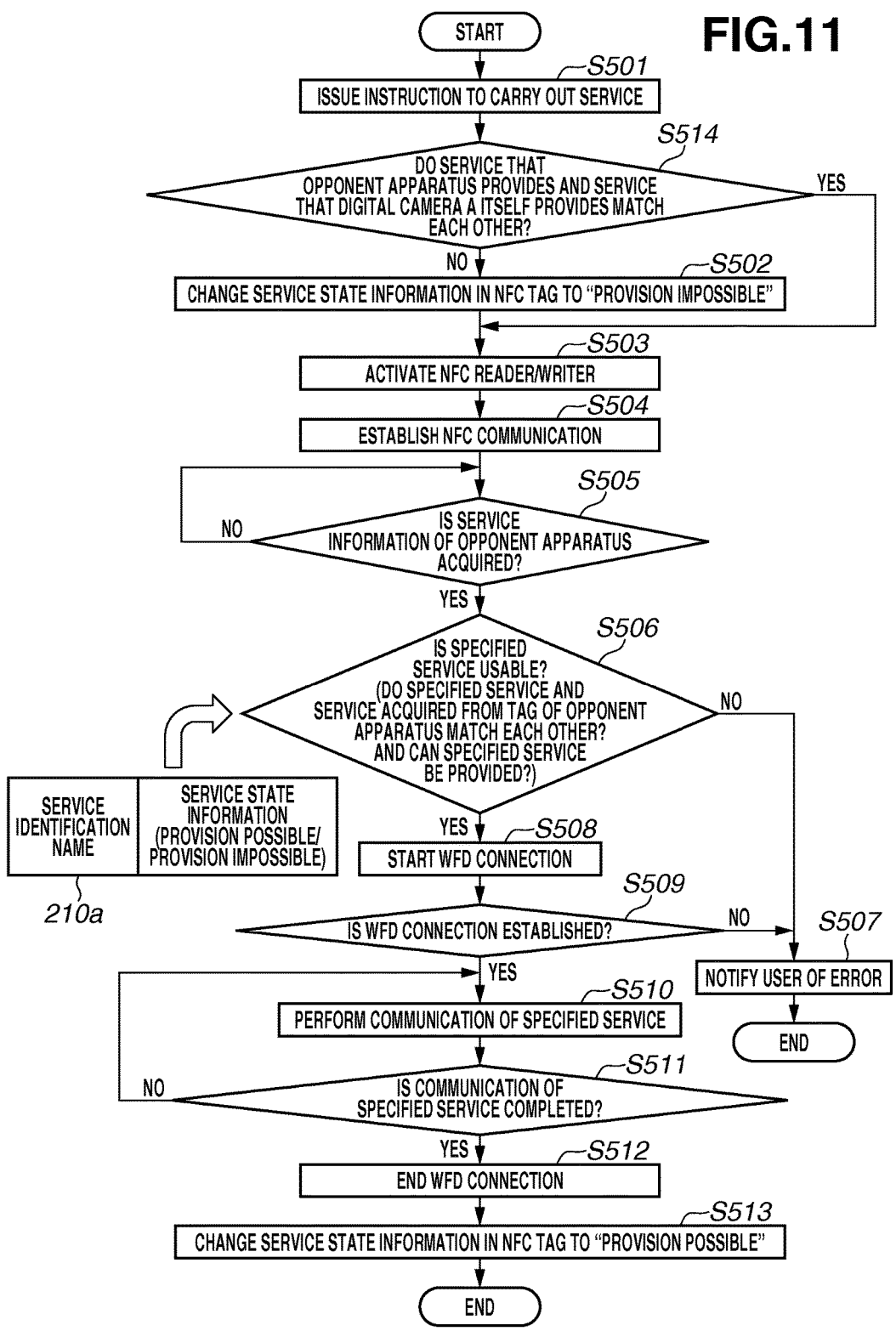

COMMUNICATION APPARATUS, METHOD FOR CONTROLLING COMMUNICATION APPARATUS, AND STORAGE MEDIUM

BACKGROUND

Field

Aspects of the present invention generally relate to a communication apparatus, a method for controlling a communication apparatus, and a storage medium.

Description of the Related Art

In recent years, in many cases, electronic apparatuses, such as digital cameras and printers, have been equipped with a wireless local area network (LAN) station function and a communication apparatus (a communication function). Such an electronic apparatus equipped with the communication apparatus or the communication function (hereinafter simply referred to as an "electronic apparatus") can connect to a wireless LAN, and wirelessly communicate with another electronic apparatus. Japanese Patent Application Laid-Open No. 2011-35768 discusses a technique for facilitating image sharing between a digital camera equipped with the wireless LAN function and another electronic apparatus.

A standard called Wireless Fidelity (Wi-Fi) Direct (registered trademark) is established by Wi-Fi Alliance as one of protocols for this wireless LAN. This Wi-Fi Direct (hereinafter referred to as "WFD") allows the electronic apparatuses equipped with the wireless LAN function to directly connect to each other via the wireless LAN to perform data communication with each other without requiring a communication apparatus such as a router and a Wi-Fi base station to intermediate therebetween. This WFD standard defines a protocol of determining which role each electronic apparatus operates, that is, whether it operates as a wireless LAN access point, or a wireless LAN station. By performing this defined protocol, the electronic apparatuses can automatically determine which apparatus serves as the wireless LAN access point, and which apparatus serves as the wireless LAN station, and establish a wireless LAN connection, so that this technique is highly convenient for a user.

For example, Near Field Communication (hereinafter referred to as "NFC") (International Organization for Standardization (ISO)/International Electrotechnical Commission (IEC) 18092, ISO/IEC 21481, or the like), which is a close proximity wireless communication technique, can be used based on the WFD standard. This NFC is applied to the electronic apparatuses as a close proximity-type non-contact communication protocol. The electronic apparatuses equipped with the NFC function can exchange data stored in the apparatuses with each other, and automatically perform data communication therebetween when brought into close proximity of each other. This function allows the user to establish the wireless LAN connection based on WFD with a desired electronic apparatus only with an easy operation.

The electronic apparatus in compliance with the NFC standard includes an NFC tag and an NFC reader/writer built therein, and performs the NFC communication with another electronic apparatus with use of these NFC tag and NFC reader/writer. The NFC tag includes, for example, a nonvolatile memory and an antenna, and can permit the NFC reader/writer of another electronic apparatus to read and write various kinds of data stored in the nonvolatile memory via the NFC communication. Further, the NFC reader/writer can read and write the data in the nonvolatile memory in the NFC tag built in another electronic apparatus via the NFC communication.

Japanese Patent Application Laid-Open No. 2009-207069 discusses a technique that exchanges information about a capability between the electronic apparatuses with use of this close proximity wireless communication (the NFC communication).

By utilizing the above-described technique, the electronic apparatus can exchange information about a communication parameter and an application for the wireless communication that the electronic apparatus itself supports, with the electronic apparatus at the other end (an opponent apparatus) with use of the NFC communication. This exchange allows the electronic apparatus to detect an electronic apparatus that can provide a desired service, and reliably and easily establish the wireless LAN connection based on WFD with the detected electronic apparatus.

The electronic apparatuses can exchange via the NFC communication information about a service that uses the communication via the wireless LAN connection, only when an identification name of the service is stored that uses the wireless LAN communication in this NFC tag. For example, in a case where the electronic apparatus has a print function as one example of such a service, this electronic apparatus can become an apparatus (a "service provider apparatus") that provides a print service when an identification name of the print service is stored in its own NFC tag.

On the other hand, the electronic apparatus at the other end can become an apparatus that uses the print service (a "service using apparatus"), if the user wants to use the print service of the service provider apparatus that provides the print service. In this case, the service using apparatus at the other end acquires the information stored in the NFC tag of the service provider apparatus from the apparatus that provides the print service (the service provider apparatus), with use of the NFC reader/writer. Then, the service using apparatus can determine whether the WFD connection for printing can be performed by checking whether there is the identification name of the print service in the information stored in this NFC tag.

At this time, when the information stored in its own NFC tag is read by the NFC reader/writer of the apparatus at the other end, the electronic apparatus having the print function (the service provider apparatus) can start the WFD connection for the print service, triggered by this reading.

The electronic apparatuses, each of which includes the NFC tag and the NFC reader/writer and can become both the service provider apparatus and the service using apparatus, establish, for example, the wireless LAN connection based on WFD (hereinafter referred to as the "WFD connection") with use of the above-described technique. This example will be described now.

For example, it is assumed that a digital camera (the electronic apparatus) supports a function of transferring an imaging file to a smartphone (the electronic apparatus) (hereinafter referred to as a "SEND service"), and a function of transmitting streaming data, such as a moving image (hereinafter referred to as a "PLAY service").

In this case, the digital camera stores information about the SEND service in its own NFC tag as the service provider apparatus of the SEND service. Further, when using the moving image streaming function, the digital camera activates the NFC reader/writer to read the NFC tag of the electronic apparatus at the other end as the apparatus using the PLAY service.

On the other hand, the smartphone stores information about the PLAY service in its own NFC tag as the apparatus providing the PLAY service and activates the NFC reader/writer to read the NFC tag of the electronic apparatus at the other end as the apparatus using the SEND service when the imaging file is received. At this time, if both the digital camera and the smartphone have activated their respective own NFC readers/writers, the WFD connection unintended by a user of one of the electronic apparatuses may be established when the digital camera and the smartphone perform the NFC communication.

This is because the WFD connection is established in a different manner depending on whether the NFC tag of the smartphone is read by the NFC reader/writer of the digital camera, or the NFC tag of the digital camera is read by the NFC reader/writer of the smartphone. The WFD connection is first established for the service stored in any of the NFC tags that is read earlier between them, and it is determined that one of the electronic apparatuses that corresponds to the NFC tag read earlier becomes the service provider apparatus, and the other electronic apparatus becomes the service using apparatus. Therefore, when the user moves the user's own electronic apparatus closer to another electronic apparatus with an intention to start a certain service, the two electronic apparatuses each attempt to read the NFC tag of the electronic apparatus at the other end. Consequently the service desired by the user is not necessarily started.

For example, suppose that the information in the NFC tag of the digital camera is read by the smartphone first as a result of the NFC communication between the digital camera and the smartphone, even though the user of the digital camera intends to receive the PLAY service. As a result, the WFD connection for the SEND service may be established, in which the digital camera becomes the service provider apparatus. In such a case, the digital camera ends up becoming the service provider apparatus although the digital camera should become the service using apparatus.

On the other hand, suppose that the information in the NFC tag of the smartphone is read by the digital camera first as a result of the NFC communication between the smartphone and the digital camera, even though the user of the smartphone intends to receive the SEND service. As a result, the WFD connection for the PLAY service may be established, in which the smartphone becomes the service provider apparatus. In such a case, the smartphone ends up becoming the service provider apparatus although the smartphone should be the service using apparatus.

Thus, the conventional method for connecting the electronic apparatuses to each other may lead to the establishment of the connection for the service unintended by the user of one apparatus when the apparatuses capable of becoming both the service provider apparatus and the service using apparatus establish the WFD connection with use of the NFC communication. As a result, the unintended communication (service) may be started.

SUMMARY

Aspects of the present invention are generally directed to providing a communication apparatus, a method for controlling a communication apparatus, and a storage medium that can effectively prevent the establishment of the connection for the service unintended by the user of the electronic apparatus.

According to an aspect of the present invention, a communication apparatus includes an acquisition unit configured to acquire, from another communication apparatus, first service information containing an identifier for identifying a first service that the another communication apparatus can provide, a storage unit configured to store second service information containing an identifier for identifying a second service and state information indicating whether the communication apparatus is capable of providing the second service, the second service information being information to be acquired by the another communication apparatus, a communication control unit configured to establish a connection for data communication between the communication apparatus and the another communication apparatus for carrying out the first service or the second service, and a setting unit configured to set the state information stored by the storage unit so that the state information indicates that the communication apparatus is incapable of providing the second service in response to issuance of an instruction to carry out the first service.

Further features of the present disclosure will become apparent from the following description of exemplary embodiments with reference to the attached drawings.

BRIEF DESCRIPTION OF THE DRAWINGS

FIG. 4 illustrates one example of a relationship in using and providing services between the two electronic apparatuses illustrated in FIG. 3.

FIG. 10 illustrates one example of a relationship in using and providing services between the two electronic apparatuses (the communication apparatuses) according to another exemplary embodiment.

FIG. 11 is a flowchart illustrating processing performed by the communication apparatus according to the other exemplary embodiment.

DESCRIPTION OF THE EMBODIMENTS

Hereinafter, a first exemplary embodiment will be described. A communication apparatus according to the first exemplary embodiment will be described in detail with reference to the drawings. In the following description, the first exemplary embodiment will be described based on an example using a wireless LAN system complying with the Institute of Electrical and Electronics Engineers (IEEE) 802.11 series, but a communication form applicable to the present exemplary embodiment is not limited to the wireless LAN complying with the IEEE 802.11 series and any communication form that would enable practice of the present exemplary embodiment is applicable.

Exemplary embodiments that will be described below are examples of aspects of the present invention, and can be modified or changed as appropriate according to a configuration of an apparatus to which aspects of the present invention are applied and various conditions. Aspects of the present invention are not limited to the exemplary embodiments described below.

(Functional Configuration of Communication Apparatus 101)

First, one example of a functional configuration of a communication apparatus 101 according to the present exemplary embodiment will be described.

Figure 1:
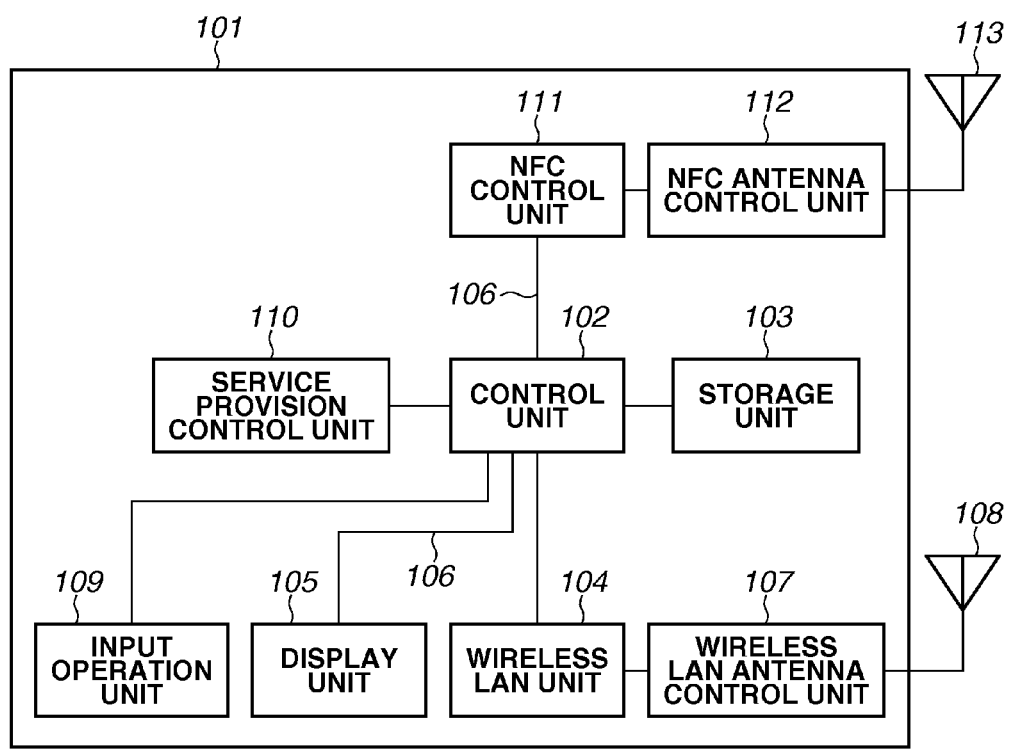
FIG. 1 is a block diagram illustrating one example of a functional configuration of a communication apparatus according to an exemplary embodiment.

FIG. 1 is a block diagram illustrating one example of the functional configuration of the communication apparatus 101. Each of component elements illustrated in FIG. 1 may be implemented as hardware devices of the communication apparatus 101, or a part thereof may be realized by software configurations illustrated in FIG. 2.

The communication apparatus 101 includes a control unit 102 that controls the entire communication apparatus 101 by executing a control program. The control unit 102 includes one or more processor(s), such as a central processing unit (CPU) or a micro processing unit (MPU), and also controls a setting of a communication parameter between the communication apparatus 101 and another apparatus when necessary. A storage unit 103 connected to the control unit 102 includes one or more memory (memories), such as a read only memory (ROM), a random access memory (RAM), a hard disk drive (HDD), or a flash memory, and stores various information, such as the control program to be executed by the control unit 102 and the communication parameter. The control unit 102 executes the control program stored in the storage unit 103 to perform various operations as described below.

Further, the communication apparatus 101 includes a wireless LAN unit 104 for performing the wireless LAN communication in compliance with the IEEE 802.11 series, and a display unit 105 that presents various displays and other outputs. The display unit 105 may output visually recognizable information, such as a liquid crystal display (LCD) or a light-emitting diode (LED), and/or output a sound (including a voice) such as sound of a speaker. The wireless LAN unit 104 and the display unit 105 are connected to the control unit 102.

Further, the communication unit 101 includes a wireless LAN antenna control unit 107 and a wireless LAN antenna 108. The wireless LAN antenna 108 transmits and receives a wireless LAN signal between the communication apparatus 101 and an external apparatus, and the wireless LAN antenna control unit 107 controls an operation of the wireless LAN antenna 108. Further, the communication apparatus 101 includes an input operation unit 109 that allows a user to, for example, enter various inputs to operate the communication apparatus 101. For example, the user can specify and request a service that another communication apparatus (an electronic apparatus) can provide by using the input operation unit 109. The input operation unit 109 is also connected to the control unit 102.

A service provision control unit 110 connected to the control unit 102 has a function of providing information about an application level service that the communication apparatus 101 can provide. For example, in a case where the communication apparatus 101 is a digital camera (or in a case where the communication apparatus 101 is mounted on a digital camera), the service provision control unit 110 of the communication apparatus 101 can provide a service such as an imaging function, the function of transmitting an imaging file, or the function of transmitting streaming data. As will be described below, the service information contains an identifier for identifying the service that the communication apparatus 101 can provide, and state information indicating whether the communication apparatus 101 is currently capable or incapable of providing this service. In the present exemplary embodiment, examples of the service that the communication apparatus 101 can provide include the SEND service of transferring a still image such as a captured image, and the PLAY service of transferring streaming data such as a moving image.

The communication apparatus 101 also includes an NFC control unit 111 for performing short-range wireless communication in compliance with the NFC standard. The NFC control unit 111 controls an NFC tag (labeled 210a in FIG. 5) and an NFC reader/writer (corresponding to units labeled 203 and 204 in FIG. 2). The NFC tag 210a includes a nonvolatile memory and an NFC antenna 113, and can permit an NFC reader/writer of an electronic apparatus at the other end (an opponent apparatus or a communication apparatus) to read and write data stored in the nonvolatile memory via the NFC communication. Further, the NFC reader/writer of the communication apparatus 101 can read and write data in a nonvolatile memory in an NFC tag of the electronic apparatus at the other end via the NFC communication. The NFC control unit 111 can read out the information in the NFC tag of the electronic apparatus at the other end from the electronic apparatus at the other end (the opponent apparatus) via an NFC antenna control unit 112 and an NFC antenna 113 based on the NFC communication standard. Further, the NFC control unit 111 can also write information specified by the user into the NFC tag 210a in the communication apparatus 101 in which this NFC control unit 111 is installed.

The NFC antenna control unit 112, and the NFC antenna 113 controlled by the NFC antenna control unit 112 are connected to the NFC control unit 111, and the NFC control unit 111 performs the NFC communication between the communication apparatus 101 and the electronic apparatus at the other end. The above-described component elements of the communication apparatus 101 are connected to one another via a bus 106.

The communication apparatus 101 may include another hardware configuration except the hardware configuration illustrated in FIG. 1. For example, the communication apparatus 101 includes an imaging unit in the case where the communication apparatus 101 is the digital camera, or includes a hardware configuration for public wireless communication (for example, Third Generation (3G), Long-Term Evolution (LTE), and Fourth Generation (4G)) in a case where the communication apparatus 101 is a smartphone.

Figure 2:
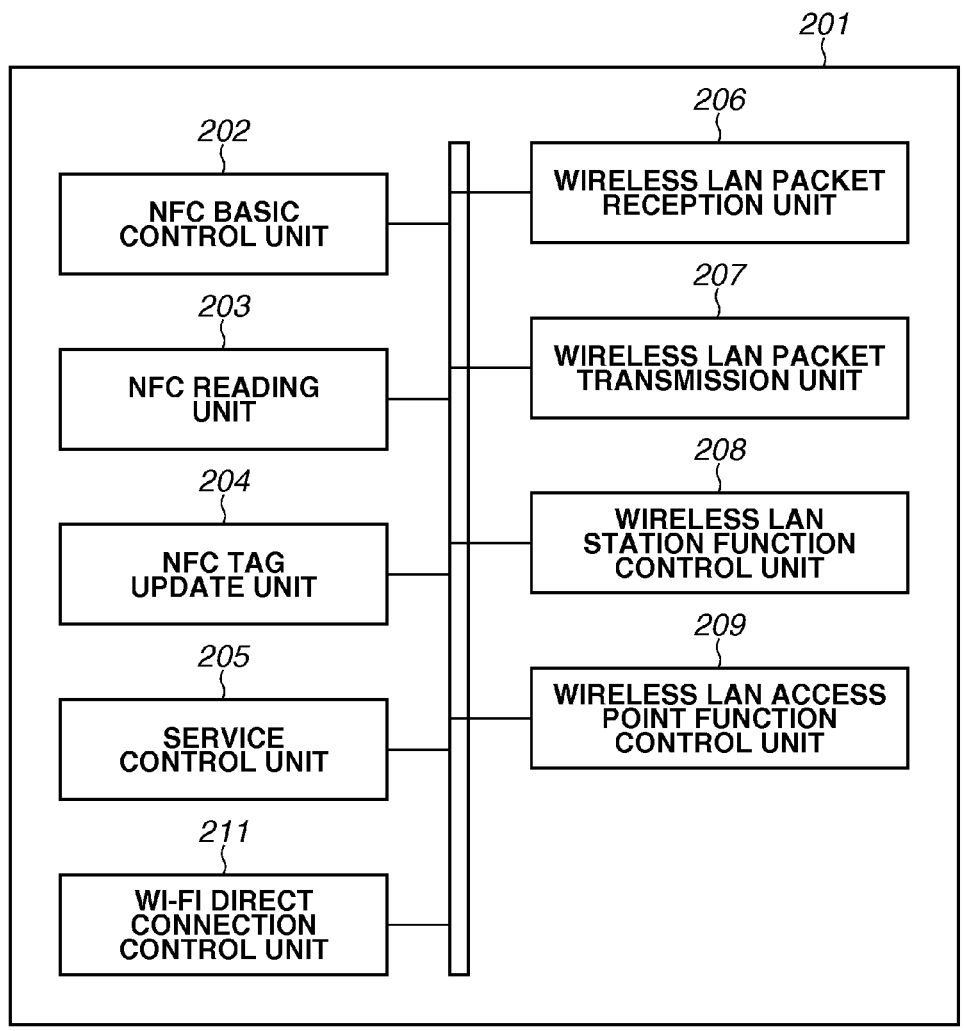
FIG. 2 is a block diagram illustrating one example of functional blocks of software in the communication apparatus according to the exemplary embodiment.

FIG. 2 is a block diagram illustrating one example of a configuration of software functional blocks that carry out the communication control function of the communication apparatus 101 illustrated in FIG. 1. A block 201 indicates the entire software functional blocks.

An NFC basic control unit 202 controls various NFC functions based on the NFC communication standard. The NFC basic control unit 202 also controls basic operations of the NFC tag 210a and the NFC reader/writer. The NFC reading unit 203 reads out the information transmitted from the communication apparatus at the other end (the opponent apparatus) via the NFC communication based on the NFC communication standard. An NFC tag update unit 204 can newly write the specified information such as the information containing the identifier of the service that the communication apparatus 101 including this NFC tag update unit 204 can provide, and the information indicating a providing state of this service, as will be described below, into the NFC tag 210*a* of the communication apparatus 101, or change the written information when necessary. The NFC basic control unit 202, the NFC reading unit 203, and the NFC tag update unit 204 correspond to the NFC control unit 111 illustrated in FIG. 1. Further, the NFC reading unit 203 and the NFC tag update unit 204 cause the NFC control unit 111, the NFC antenna control unit 112, and the NFC antenna 113 illustrated in FIG. 1 to operate to implement the function of the NFC reader/writer. Further, the NFC reading unit 203 and the NFC tag update unit 204 may cause the control unit 102 illustrated in FIG. 1 to operate to implement the function of the NFC reader/writer.

A service control unit 205 performs control for providing the service in an application layer. The application layer here refers to a service providing layer among upper layers that is Layer 5 or a layer above in the Open Systems Interconnection (OSI) reference model. For example, the service control unit 205 controls the layer that provides the print function, the moving image streaming function, and the file transfer function. The service control unit 205 causes the service provision control unit 110 illustrated in FIG. 1 to operate to implement the function of providing or controlling the service in the application layer.

A wireless LAN packet reception unit 206 and a wireless LAN packet transmission unit 207 each perform the wireless LAN communication in compliance with the IEEE 802.11 standard between the communication apparatus 101 and the communication apparatus at the other end (the opponent apparatus).

A wireless LAN station function control unit 208 provides a station (STA) function defined in the IEEE 802.11 standard. The wireless LAN station function control unit 208 can also perform authentication/encryption processing and the like when the communication apparatus 101 operates as the wireless LAN station. A wireless LAN access point function control unit 209 provides an access point (AP) function defined in the IEEE 802.11 standard. The wireless LAN access point function control unit 209 can also perform authentication/encryption processing, management of the opponent apparatus, and the like when the communication apparatus 101 operates as the wireless LAN access point function.

The wireless LAN station function control unit 208 and the wireless LAN access point function control unit 209 can carry out any one of the wireless LAN functions (any of the wireless LAN station function and the wireless LAN access point function), or both of the functions at the same time. A Wi-Fi Direct connection control unit 211 controls establishment of the WFD connection via the wireless LAN communication and the NFC communication, data communication, and a disconnection. The wireless LAN packet reception unit 206, the wireless LAN packet transmission unit 207, the wireless LAN station function control unit 208, the wireless LAN access point function control unit 209, and the Wi-Fi Direct connection control unit 211 cause the wireless LAN unit 104, the wireless LAN antenna control unit 107, and the wireless LAN antenna 108 illustrated in FIG. 1 to operate to provide the wireless LAN communication function and the WFD communication function. Further, they may also cause the control unit 102 illustrated in FIG. 1 to operate to implement the wireless LAN communication function and the WFD communication function.

The above-described functional blocks are merely one example. A plurality of functional blocks may be integrated into a single functional block, and some of the functional blocks may be configured to further carry out another function. Further, the above-described corresponding relationships between FIG. 1 and FIG. 2 are also merely one example. For example, the control unit 102 may be involved in all of the operations.

Figure 3:
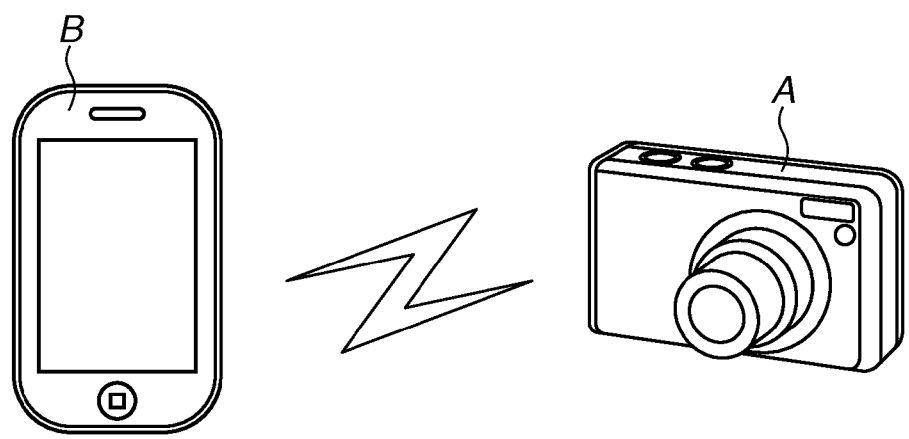
FIG. 3 illustrates one example of a network configuration applied to two electronic apparatuses each including the communication apparatus according to the exemplary embodiment.

FIG. 3 illustrates an example in which the data communication is performed via the wireless LAN communication between a digital camera A and a smartphone B, each of which is the electronic apparatus including the communication apparatus 101 illustrated in FIGS. 1 and 2 that is built (mounted) therein.

In the present first exemplary embodiment, assume that the digital camera A can operate as the provider apparatus of the SEND service, and the smartphone B can operate as the provider apparatus of the PLAY service, as illustrated in FIG. 4. Referring to FIG. 4, the information about the SEND service is stored in the NFC tag 210*a* of the digital camera A as the service information. On the other hand, the information about the PLAY service is stored in the NFC tag 210*a* of the smartphone B as the service information. In other words, the digital camera A can operate as the provider apparatus of the SEND service, and the smartphone B can operate as the provider apparatus of the PLAY service in terms of the service provider apparatus. On the other hand, the digital camera A can operate as the service using apparatus utilizing the PLAY service, and the smartphone B can operate as the service using apparatus utilizing the SEND service in terms of the service using apparatus.

In the following description, assume that a service specified and requested by a user of the digital camera A is the PLAY service, which the digital camera A receives from the smartphone B as the service (the service when the digital camera A becomes the service using apparatus). On the other hand, assume that a service specified and requested by a user of the smartphone B is the SEND service, which the smartphone B receives from the digital camera A as the service. The SEND service information stored in the NFC tag 210*a* of the digital camera A contains a service identification name of the SEND service that the digital camera A can provide, and service state information indicating whether the SEND service can be provided (refer to the NFC tag 210*a* illustrated in FIG. 5). This service state information has values each indicating whether the providing state is "provision possible" or "provision impossible" with respect to the service identified by the service identifier.

When the service information (the SEND service information) stored in the NFC tag 210*a* of the digital camera A, which is its own apparatus, is read out by the NFC reader/writer of the smartphone B, the NFC communication is established between this NFC reader/writer and the NFC tag 210*a*. The digital camera A establishes the WFD connection for the SEND service read by the NFC reader/writer of the smartphone B which is triggered by this established NFC communication, and starts data transmission from the smartphone B to the digital camera A via this WFD connection.

On the other hand, the PLAY service information stored in the NFC tag 210*a* of the smartphone B contains a service identification name of the PLAY service that the smartphone B can provide, and service state information indicating whether the PLAY service can be provided. As described above, this service state information also has at least two values indicating whether the proving state is "provision possible" or "provision impossible" with respect to the service identified by the service identifier.

The operation is performed in the following manner in a case where the smartphone B is the current subject apparatus. When the service information (the PLAY service information) stored in the NFC tag 210a of the smartphone B, which is its own apparatus, is read out by the NFC reader/writer of the digital camera A, the NFC communication is established between this NFC reader/writer and the NFC tag 210a. The smartphone B establishes the WFD connection for the PLAY service read out by the NFC reader/writer of the digital camera A, which is triggered by this established NFC communication, and starts data transmission from the digital camera A to the smartphone B via this WFD connection.

In the present exemplary embodiment, assume that "provision possible", which indicates that the service can be provided, is set as an initial value of the above-described service state information. Until the user of the communication apparatus 101 specifies the service to be provided by the other communication apparatus and requests a start of the service, the service that the user's own communication apparatus 101 can provide to the other communication apparatus can be requested in response to a request from the other communication apparatus. Accordingly, "provision possible" is set as the initial value of the service state information.

Figure 5:
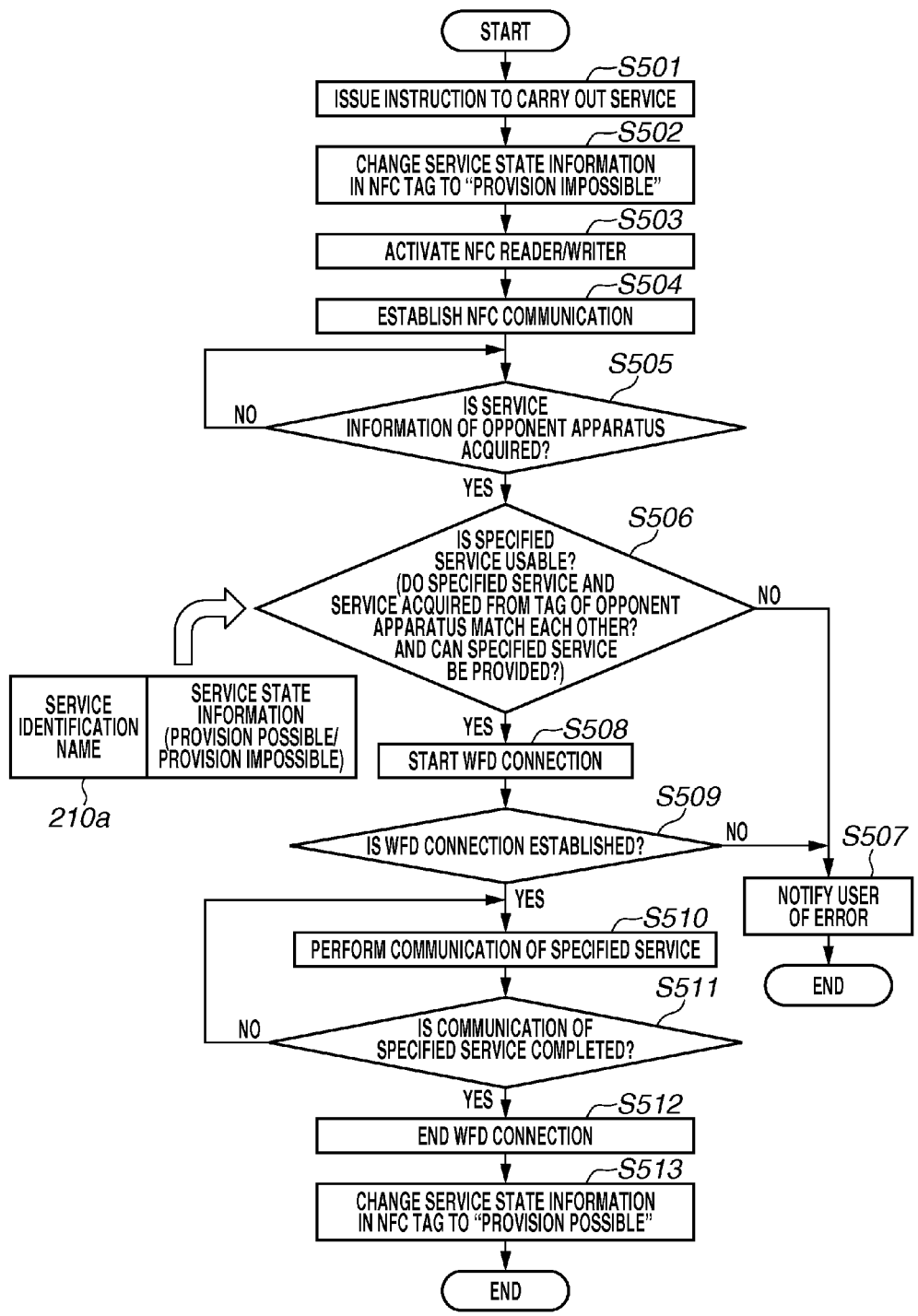
FIG. 5 is a flowchart illustrating processing performed by the communication apparatus according to the exemplary embodiment.

FIG. 5 is a flowchart illustrating a processing operation for carrying out the service when the service specified by the user (hereinafter referred to as the "specified service") is carried out at the digital camera A or the smartphone B. The control unit 102 may read out the computer program stored in the storage unit 103 to execute the read computer program to perform the processing illustrated in FIG. 5.

The flowchart illustrated in FIG. 5 is first started, when the user operates the input operation unit 109 of the digital camera A to specify the service to be carried out. More specifically, first, in step S501, the digital camera A receives an instruction to carry out the service that is issued by the user. After that, in step S502, the communication apparatus 101 of the digital camera A updates the service state information stored in the NFC tag 210a from "provision possible", which is the initial value, to "provision impossible" by the NFC tag update unit 204.

After this update of the service state information, in step S503, the communication apparatus 101 of the digital camera A activates the NFC reader/writer with use of the NFC reading unit 203. After the activation of the NFC reader/writer, in step S504, the communication apparatus 101 of the digital camera A establishes the NFC communication between the communication apparatus 101 of the digital camera A, and the communication apparatus 101 at the other end such as the smartphone B. After that, the communication apparatus 101 of the digital camera A starts to read out the service information (first service information) stored in the NFC tag 210a of the smartphone B.

If the service information (the first service information) is read out from the NFC tag 210a of the smartphone B (YES in step S505), in step S506, the communication apparatus 101 of the digital camera A refers to the read service information. By this reference, the communication apparatus 101 of the digital camera A checks whether the service specified in step S501 is usable at the smartphone B (the opponent apparatus) in which the NFC communication has been implemented.

More specifically, the communication apparatus 101 of the digital camera A determines that the specified service is usable, if the service identification name in the service information stored in the NFC tag 210a of the smartphone B matches the identification name of the specified service specified in step S501, and if the service state information in the service information stored in the NFC tag 210a of the smartphone B is in the state of "provision possible" (YES in step S506).

On the other hand, if the specified service is unusable in step S506 (NO in step S506), in step S507, the communication apparatus 101 of the digital camera A notifies the user of an error, and then ends the processing. The communication apparatus 101 of the digital camera A may notify the user of the error, for example, with use of the display unit 105.

Further, the communication apparatus 101 of the digital camera A may also determine that the specified service is unusable if the required information is not stored or an invalid value such as an error value, is stored in the service information read out from the NFC tag 210a of the communication apparatus 101 of the smartphone B. If the communication apparatus 101 of the digital camera A determines that the specified service is unusable (NO in step S506), in step S507, the communication apparatus 101 of the digital camera A may notify the user of the error, and then end the processing for carrying out the specified service.

In step S503 or S504, the communication apparatus 101 of the digital camera A may start to measure a time by setting a reading timer. If the service information cannot be read out from the NFC tag 210a of the communication apparatus 101 of the smartphone B within a predetermined time period (NO in step S505), the communication apparatus 101 of the digital camera A may end the processing as an error in response to a timeout of the reading timer. This configuration allows the communication apparatus 101 of the digital camera A to quickly shift to required subsequent processing without waiting for a recovery, and also prevents generation of unnecessary traffic, in the case of a communication error or busy traffic between the apparatuses.

Referring back to step S506, if the specified service is usable (YES in step S506), in step S508, the communication apparatus 101 of the digital camera A starts to establish the WFD connection with the communication apparatus 101 of the smartphone B (the opponent apparatus) with use of the Wi-Fi Direct connection control unit 211. If the WFD connection is established (YES in step S509), in step S510, the communication apparatus 101 of the digital camera A carries out the data transmission/reception set in the specified service between the communication apparatus 101 of the digital camera A and the communication apparatus 101 of the smartphone B (the opponent apparatus) via the established WFD connection.

If the WFD connection is not established for a reason such as a connection error in step S509 (NO in step S509), in step S507, the communication apparatus 101 of the digital camera A notifies the user of an error, and then ends the processing.

In step S510, the communication apparatus 101 of the digital camera A carries out the data transmission/reception set in the specified service. Then, if the communication of the specified service is completed (YES in step S511), in step S512, the communication apparatus 101 of the digital camera A ends the WFD connection with the communication apparatus 101 of the smartphone B (the opponent apparatus).

After the end of the WFD connection, in step S513, the communication apparatus 101 of the digital camera A updates the service state information stored in the NFC tag 210a from "provision impossible" to "provision possible" by the NFC tag update unit 204, and then ends the processing.

According to the flowchart illustrated in FIG. 5, in this manner, the digital camera A sets the service state information in the NFC tag 210a of the digital camera A to "provision impossible" (step S502), which is triggered by the issue of the instruction to carry out the specified service at the digital camera A (step S501), before activating the NFC reader/writer of the communication apparatus 101 of this digital camera A itself (step S503). Therefore, after that, the digital camera A is prevented from functioning as the service provider apparatus of the service that can be provided by the communication apparatus 101 of this digital camera A itself but is not intended by the user until the service state information is changed to "provision possible" (step S513 illustrated in FIG. 5: after the end of the WFD connection).

In the above-described example, the service state information in the NFC tag 210a is changed from "provision impossible" to "provision possible" after the end of the communication of the specified service via the WFD connection and then the end of the WFD connection. However, in the present exemplary embodiment, the timing at which the service state information is changed to "provision possible" is not limited to this example.

For example, if the specified service is unusable in step S506, if the WFD connection is not established in step S509, or if the processing is ended as an error for some reason, the service state information in the NFC tag 210a of the digital camera A may be changed from "provision impossible" to "provision possible" together with the issue of the error notification in step S507. The communication apparatus 101 configured in this manner allows the digital camera A to more quickly return to the state where the service can be provided to the other apparatus, even when an error occurs in the communication or both of the communication apparatuses 101, so that providing of the desired specified service is determined to be impossible.

Alternatively, the service state information in the NFC tag 210a may be changed to "provision possible" when the WFD connection has been established and then the communication of the specified service has started (step S510). The communication apparatus 101 configured in this manner can eliminate the necessity of, for example, waiting for the end of the data communication that, for example, occupies a large capacity and takes a long time for the specified service provided via the WFD connection between the communication apparatus 101 of the digital camera A and the communication apparatus 101 of the smartphone B. This reduced waiting time can enhance opportunities to more quickly provide the service that the communication apparatus 101 of the digital camera A itself can provide to, for example, another communication apparatus 101 than the smartphone B (for example, a smartphone C illustrated in FIG. 9, which will be described below).

Further, a timer may be set when the NFC reader/writer is activated (step S503), and the service state information in the NFC tag 210a of the digital camera A may be changed from "provision impossible" to "provision possible" after a predetermined time period has elapsed. The order of step S512 and step S513 may be reversed.

In the above-described description, in step S502, the NFC tag update unit 204 updates (changes) the service state information stored in the NFC tag 210a to "provision impossible", so that the NFC tag update unit 204 sets the service information to the state incapable of providing the service. The NFC tag update unit 204 corresponds to a setting unit recited in the claims. Further, since the NFC tag update unit 204 corresponds to the NFC control unit 111, the NFC control unit 111 can also constitute a whole or a part of the service state update unit, and it can be also said that the NFC tag update unit 204 and the NFC control unit 111 correspond to the setting unit.

Further, in steps S503 to S505, the communication apparatus 101 of the digital camera A activates the NFC reader/writer, establishes the NFC communication, and reads out the service information from the NFC tag 210a of the smartphone B with use of the NFC reading unit 203. Therefore, the NFC reading unit 203 and the NFC reader/writer correspond to an acquisition unit recited in the claims.

In a case where the instruction to carry out the specified service is issued from the user at the smartphone B, similar processing to the processing described with reference to FIG. 5 is also performed.

Figure 6:
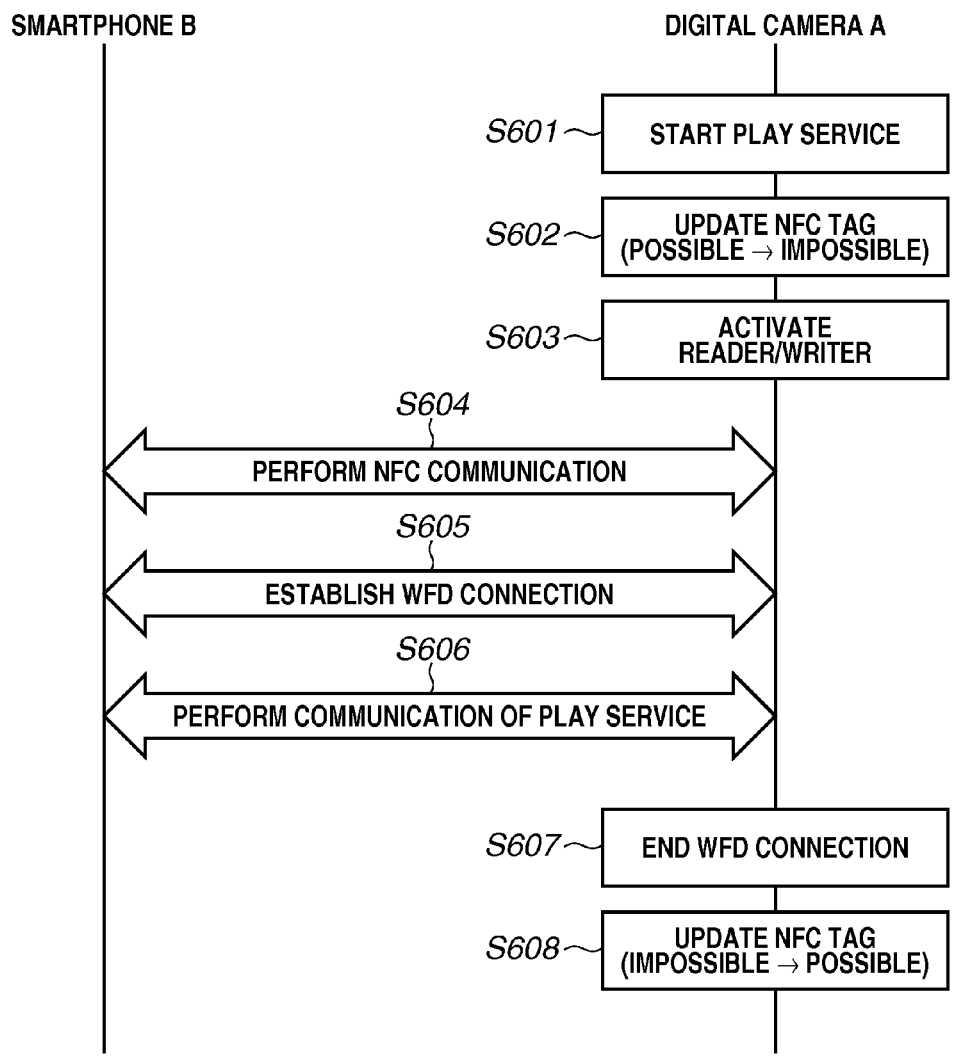
FIG. 6 illustrates one example of an operation sequence performed between the two electronic apparatuses (the communication apparatuses) illustrated in FIG. 3.

FIG. 6 illustrates a processing sequence performed between the communication apparatuses 101 (for example, the digital camera A and the smartphone B) that perform the processing illustrated in the flowchart described with reference to FIG. 5. As one example of this processing sequence, FIG. 6 illustrates a processing sequence performed in a case where an instruction to carry out the PLAY service is issued at the digital camera A, and the digital camera A and the smartphone B perform the NFC communication therebetween which is triggered by this issue.

First, in step S601, the instruction to carry out the PLAY service is issued by a user's operation at the digital camera A, and the digital camera A starts the processing for carrying out the service triggered by this issue that has been described with reference to FIG. 5. After the start of the processing for carrying out the service, in step S602, the digital camera A changes the service state information about the SEND service that is stored in the NFC tag 210a of the communication apparatus 101 of this digital camera A itself from "provision possible" to "provision impossible". Then, in step S603, the digital camera A activates the NFC reader/writer.

After that, in step S604, the NFC communication is performed between the digital camera A and the smartphone B, and the digital camera A acquires the service information stored in the NFC tag 210a of the smartphone B (the opponent apparatus).

On the other hand, even if the NFC tag 210a of the digital camera A is read by the smartphone B side via the NFC communication, the service state information about the SEND service that is defined in the NFC tag 210a of the digital camera A has been already set to "provision impossible". Therefore, activation of the SEND service unintended by the user of the digital camera A is prevented.

In step S605, the digital camera A establishes the WFD connection with the smartphone B since the acquired state information about the PLAY service is set to "provision possible".

After the establishment of the WFD connection, in step S606, the digital camera A conducts the communication of the PLAY service between the digital camera A and the smartphone B.

After completion of the communication of the PLAY service, in step S607, the digital camera A ends the WFD connection. Then, in step S608, the digital camera A changes the service state information in the NFC tag 210a from "provision impossible" to "provision possible".

In this manner, when the instruction to carry out the service is issued only at one of the apparatuses (in the illustrated example, the instruction to carry out the service is issued only at the digital camera A), the digital camera A including the communication apparatus 101 according to the present first exemplary embodiment can allow this service to be carried out as intended by the user.

Figure 7:
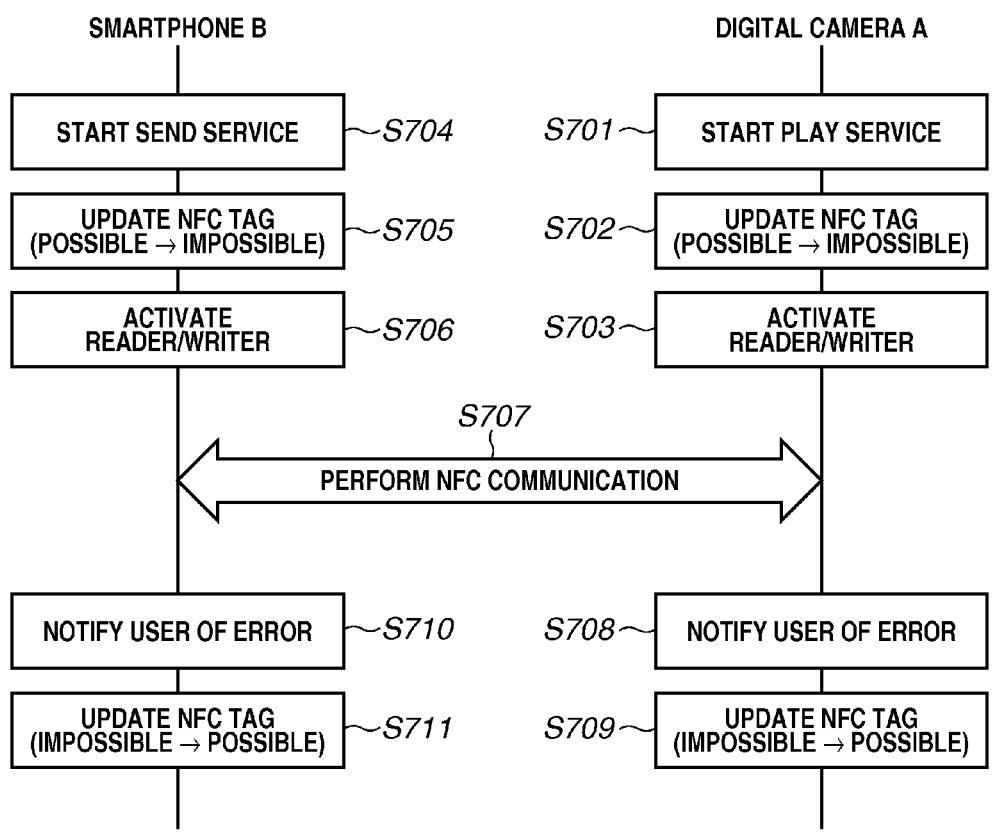
FIG. 7 illustrates one example of another operation sequence performed between the two electronic apparatuses (the communication apparatuses) illustrated in FIG. 3.

FIG. 7 illustrates, as one example, a processing sequence performed in a case where the NFC communication is performed between the communication apparatus 101 of the digital camera A and the communication apparatus 101 of the smartphone B when an instruction to carry out the PLAY service is issued at the digital camera A, and further, an instruction to carry out the SEND service is issued at the smartphone B.

First, in step S701, the instruction to carry out the PLAY service is issued by a user's operation at the digital camera A, and the digital camera A starts the processing for carrying out the service that has been described with reference to FIG. 5, which is triggered by this issue. After the start of the processing for carrying out the service, in step S702, the digital camera A changes the service state information about the SEND service that is stored in the NFC tag 210a of its own communication apparatus 101 of this digital camera A, from "provision possible" to "provision impossible". Then, in step S703, the digital camera A activates the NFC reader/writer.

On the other hand, assume that, in step S704, the instruction to carry out the SEND service is issued by a user's operation at the smartphone B, asynchronous with the user's operation performed on the digital camera A, for example, at the same time (or at the substantially same time) as the user's operation performed on the digital camera A, and the smartphone B starts the processing for carrying out the service that has been described with reference to FIG. 5, which is triggered by this issue. After the start of the processing for carrying out the service, in step S705, the smartphone B changes the service state information about the PLAY service that is stored in the NFC tag 210a of the communication apparatus 101 of its own smartphone B from "provision possible" to "provision impossible". Then, in step S706, the smartphone B activates the NFC reader/writer.

The processing from step S701 to step S703, and the processing from step S704 to step S706 illustrated in FIG. 7 can be performed at timings independently of each other, and the illustration in FIG. 7 is not intended to define an order in which these processing procedures are performed.

After that, in step S707, the NFC communication is performed between the digital camera A and the smartphone B, and the communication apparatus 101 of the digital camera A acquires the service information stored in the NFC tag 210a of the smartphone B. On the other hand, the communication apparatus 101 of the smartphone B individually acquires the service information stored in the NFC tag 210a of the digital camera A.

In step S708, the digital camera A notifies the user that the specified PLAY service cannot be carried out since the acquired state information about the PLAY service is set to "provision impossible". After that, in step S709, the digital camera A changes the service state information in the NFC tag 210a of the communication apparatus 101 of its own digital camera A from "provision impossible" to "provision possible".

On the other hand, in step S710, the smartphone B also notifies the user that the specified SEND service cannot be carried out since the acquired state information about the SEND service is set to "provision impossible". After that, in step S711, the smartphone B changes the service state information in the NFC tag 210a of the communication apparatus 101 of its own smartphone B from "provision impossible" to "provision possible".

As with the above-described steps, the processing from step S708 to step S709, and the processing from step S710 to step S711 illustrated in FIG. 7 can be performed at timings independently of each other, and the illustration in FIG. 7 is not intended to define an order in which these processing procedures are performed.

In this manner, the communication apparatus 101 according to the present first exemplary embodiment does not unintentionally become the service provider apparatus, by notifying the other apparatus that the communication apparatus 101 is incapable of providing the service supposed to be provided by its own communication apparatus 101 when approaching (contacting or accessing) the service provider apparatus (the opponent apparatus). Therefore, the communication apparatus 101 can prevent the unintended service from being carried out (can prevent itself from becoming the service provider apparatus despite the intention to become the service using apparatus).

In FIG. 7, the SEND service may be specified at the smartphone B at a delayed timing, so that the NFC communication may be established from the digital camera A to the smartphone B (step S707) before the NFC tag is updated (step S705). In such a case, the service (the PLAY service) specified at the digital camera A is executed via the WFD connection since the service state information in the NFC tag 210a of the smartphone B is still set to "provision possible", which is the initial value.

Figure 8:
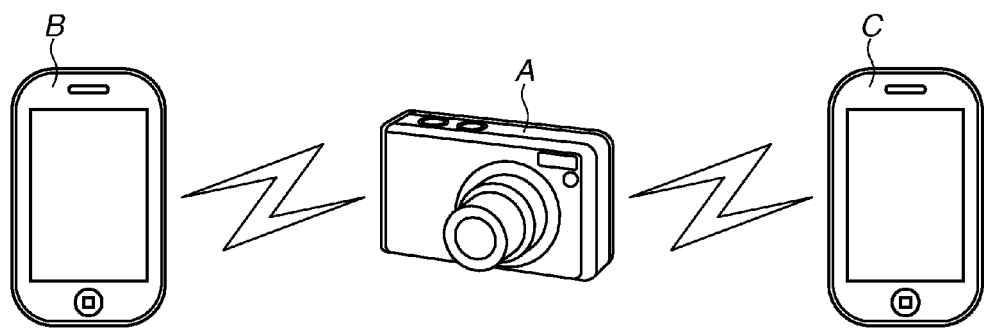
FIG. 8 illustrates one example of a network configuration applied to three electronic apparatuses (communication apparatuses).

Next, suppose that the NFC communication is performed between the digital camera A and the smartphone B, and the NFC communication is also performed between the digital camera A and the smartphone C as illustrated in FIG. 8. An operation in this case will be described with reference to FIGS. 8 and 9.

Figure 9:
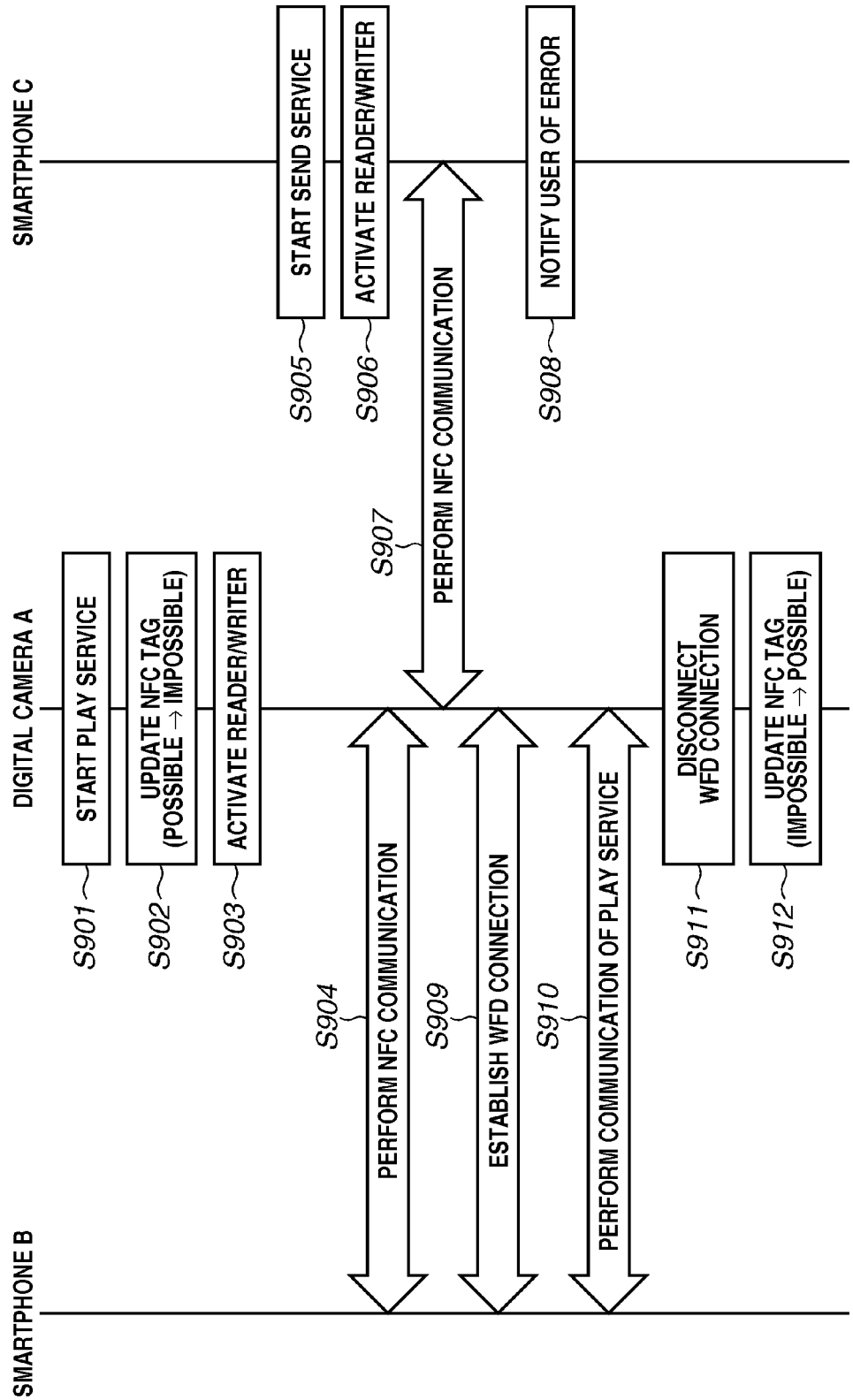
FIG. 9 illustrates one example of an operation sequence performed among the three electronic apparatuses (the communication apparatuses) illustrated in FIG. 8.

FIG. 9 illustrates a processing sequence performed in a case where an instruction to carry out the SEND service is issued to the digital camera A at the smartphone C when the digital camera A and the smartphone B perform the NFC communication therebetween while an instruction to carry out the PLAY service is issued to the smartphone B at the digital camera A. Assume that no instruction to carry out the service is issued at the smartphone B at this time. In the following description, a processing operation performed among the digital camera A, the smartphone B, and the smartphone C will be described with reference to FIG. 9.

First, in step S901, the instruction to carry out the PLAY service is issued by a user's operation at the digital camera A, and the digital camera A starts the processing for carrying out the service that has been described with reference to FIG. 5, which is triggered by this issue. After the start of the processing for carrying out the service, in step S902, the digital camera A changes the service state information about the SEND service in the NFC tag 210a of its own communication apparatus 101 from "provision possible" to "provision impossible". Then, in step S903, the digital camera A activates the NFC reader/writer of its own communication apparatus 101.

In step S904, the NFC communication is performed between the digital camera A and the smartphone B, which is triggered by this activation, and the digital camera A acquires the service information stored in the NFC tag 210a of the communication apparatus 101 of the smartphone B (the opponent apparatus) via this NFC communication. At this time, since the NFC tag 210a is not updated at the smartphone B, setting of the service state information remains "provision possible", which is the initial value.

Independently, in step S905, the instruction to carry out the SEND service is issued by a user's operation at the smartphone C, and the smartphone C starts to detect a communication apparatus capable of providing the SEND service, which is triggered by this issue.

After the start of the detection of a communication apparatus capable of providing the SEND service, in step S906, the smartphone C activates the NFC reader/writer. Then, in step S907, the smartphone C performs the NFC communication with the digital camera A, and acquires the service information stored in the NFC tag 210a of the digital camera A (the opponent apparatus).

In step S908, the smartphone C notifies the user of an error, indicating that the specified SEND service cannot be carried out, since the state information about the SEND service that has been acquired from the digital camera A via the NFC communication is set to "provision impossible".

On the other hand, in step S909, the digital camera A establishes the WFD connection with the smartphone B since the state information about the PLAY service that has been acquired from the smartphone B via the NFC communication is set to "provision possible".

After the establishment of the WFD connection, in step S910, the digital camera A performs the communication of the PLAY service between the digital camera A and the smartphone B via the WFD connection.

After completion of the communication of the PLAY service, in step S911, the digital camera A ends or disconnects the WFD connection. Then, in step S912, the digital camera A changes the service state information in the NFC tag 210a of its own communication apparatus 101 from "provision impossible" to "provision possible".

In this manner, even in the case where the digital camera A performs the NFC communication with another apparatus (the smartphone C) different from the opponent apparatus (the smartphone B) when the digital camera A starts the communication with the opponent apparatus, the digital camera A can prevent the service unintended by the user of the digital camera A from being carried out. Further, the smartphone C can also be prevented from carrying out the service unintended by the user of the smartphone C In the above-described manner, the digital camera A can prevent the service unintended by the user of the digital camera A from being carried out, by notifying the other apparatuses (the smartphones B and C) that the digital camera A is incapable of providing the service supposed to be provided by itself (the digital camera A) when detecting the service provider apparatus (the smartphone B). Therefore, usability of the digital camera A can be improved.

In the example illustrated in FIG. 9, since establishment of the NFC communication from the digital camera A to the smartphone C is not intended by the user of the digital camera A, the smartphone C may include the built-in communication apparatus 101 according to the present first exemplary embodiment, or may not include the built-in communication apparatus 101, having no function of holding and updating the service state information.

Hereinafter, exemplary modifications of the first exemplary embodiment will be described. In the above-described example, the NFC tag update unit 204 changes the service state information in the NFC tag 210a of the communication apparatus 101 in which this NFC tag update unit 204 is included, from "provision possible" which is the initial value, to "provision impossible", according to or triggered by, for example, the issue of the instruction to carry out the specified service from the user (a specifying input). However, in the first exemplary embodiment, the timing at which the service state information is changed to "provision impossible" is not limited to this example.

For example, in a case where the service is automatically started when the apparatuses approach each other instead of the issue of the instruction to carry out the specified service from the user (the specifying input), a similar effect can be achieved by changing the service state information in the NFC tag 210a of its own communication apparatus 101 from "provision possible", which is the initial value, to "provision impossible" at least before the connection (the WFD connection) for the data communication is established between the apparatuses.

Alternatively, in a case where the service is automatically started with no issue of the instruction to carry out the specified service from the user (the specifying input), for example, the digital camera A receives and detects the access to the NFC tag 210a of its own apparatus, from the NFC reader/writer of the other communication apparatus (the electronic apparatus). After this detection, the digital camera A changes the service state information in the NFC tag 210a of its own communication apparatus 101 from "provision possible", which is the initial value, to "provision impossible" before the NFC tag 210a of its own apparatus is read by the NFC reader/writer of the other communication apparatus. The effect of aspects of the present invention can be achieved in such a case with this method. Similarly, in the case where the service is started which is triggered by the issue of the instruction to carry out the specified service from the user (the specifying input), for example, the digital camera A receives and detects the access to the NFC tag 210a of its own apparatus, from the NFC reader/writer of the other communication apparatus (the electronic apparatus). After this detection, the digital camera A changes the service state information in the NFC tag 210a of the communication apparatus 101 of its own apparatus from "provision possible", which is the initial value, to "provision impossible" before the NFC tag 210a of its own apparatus is read by the NFC reader/writer of the other communication apparatus. The communication apparatus 101 configured in this manner can further enhance opportunities to provide the service that its own communication apparatus 101 can provide to the other communication apparatus (including another communication apparatus than the opponent apparatus) while effectively preventing the establishment of the WFD connection and the start of the service unintended by the user of the communication apparatus 101.

In the following description, a second exemplary embodiment will be described. In the above-described first exemplary embodiment, for example, when the user of the digital camera A issues the instruction to carry out the PLAY service (step S601) as illustrated in FIG. 6 under the service use/provision relationship illustrated in FIG. 4, the digital camera A changes the service state information about the SEND service in the NFC tag 210a of its own communication apparatus 101 to "provision impossible" (step S602). However, aspects of the present invention are not limited to such an exemplary embodiment.

For example, as illustrated in FIG. 10, the digital camera A may be configured to become the provider apparatus of the SEND service and also become the service using apparatus utilizing the SEND service, and the smartphone B may be configured to become the service using apparatus utilizing the SEND service and also become the provider apparatus of the SEND service. The second exemplary embodiment, in such a configuration, additionally includes processing for determining whether the service state information in the NFC tag 210*a* of the communication apparatus 101 of the current subject apparatus should be changed to "provision impossible" before the NFC communication is established, unlike the first exemplary embodiment.

In the following description, an operation process according to the second exemplary embodiment will be described with reference to FIG. 11, based on the example in which the digital camera A becomes the provider apparatus and also becomes the service using apparatus at the same time with respect to the SEND service as illustrated in FIG. 10.

FIG. 11 is a flowchart illustrating processing performed by the communication apparatus 101 of the digital camera A in a case where an instruction to carry out the SEND service is issued at the digital camera A, and further, an instruction to carry out the SEND service is issued at the smartphone B. In the first exemplary embodiment and the second exemplary embodiment, corresponding component elements and steps are identified by the same reference numerals and step numbers.

As illustrated in FIG. 11, in step S501, the instruction to carry out the SEND service is issued by a user's operation at the digital camera A, and the processing for carrying out the specified service is started. Assume that the instruction to carry out the service is also issued at the smartphone B at this time. Next, in step S514, the communication apparatus 101 of the digital camera A determines whether the service specified from the smartphone B, which is the opponent apparatus, and the service specified at the digital camera A in step S501 match each other. If the specified services at the two electronic apparatuses (the digital camera A and the smartphone B) match each other (YES in step S514), the processing proceeds to step S503. In other words, referring to FIG. 10, both the digital camera A and the smartphone B can become the service provider apparatus with respect to the SEND service. In this case, the communication apparatus 101 of the digital camera A activates the NFC reader/writer without changing the service state information in the NFC tag 210*a*, to "provision impossible". The operation process after that is similar to the processing described with reference to FIG. 5 in the first exemplary embodiment (however, if the services that the both apparatuses provide match each other in step S514 (YES in step S514), the service state information in the NFC tag 210*a* is not changed from "provision possible" to "provision impossible" in step S514, which eliminates the necessity of the processing for changing the service state information back to "provision possible", which is the initial value, in step S513).

Then, referring to FIG. 10, suppose that the SEND service is intended to be carried out at both the digital camera A and the smartphone B, and the SEND service is specified at both the digital camera A and the smartphone B. The SEND service is written in the service information stored in the NFC tag 210*a* of the communication apparatus 101 of the digital camera A as the service that the digital camera A can provide. The digital camera A can provide the SEND service requested from the smartphone B to the smartphone B. Therefore, the determination in step S514 results in YES. If the service that the opponent apparatus provides and the service that the digital its own apparatus provides match each other in step S514 (YES in step S514), any one of the digital camera A and the smartphone B starts to establish the WFD connection. In this case, since the service carried out via the WFD connection is the SEND service desired by the both apparatuses' sides, there is no problem with the digital camera A even if the SEND service that the digital camera A itself can provide is started, unlike the example described in the first exemplary embodiment.

On the other hand, if the communication apparatus 101 of the digital camera A determines that the service specified at the opponent apparatus (the smartphone B) and the service specified at the digital camera A do not match each other in step S514 (NO in step S514), the processing proceeds to step S502. In step S502, the communication apparatus 101 of the digital camera A changes the service state information in the NFC tag 210*a* of its own communication apparatus 101 from "provision possible" to "provision impossible". The operation process after that is similar to the processing described with reference to FIG. 5.

Step S514 functions as a determination unit configured to determine whether the service of the smartphone B (a first service) and the service of the digital camera A (a second service) can be carried out at the same time.

In this manner, if the SEND service is to be carried out at both the digital camera A and the smartphone B, the WFD connection may be established. If the NFC reader/writer of the digital camera A approaches the NFC tag 210*a* of the smartphone B earlier than the NFC reader/writer of the smartphone B approaches the NFC tag 210*a* of the digital camera A, the service specified at the digital camera A is carried out. If the NFC reader/writer of the smartphone B approaches the NFC tag 210*a* of the digital camera A earlier than the NFC reader/writer of the digital camera A approaches the NFC tag 210*a* of the smartphone B, the service specified at the smartphone B is carried out.

In the case where the electronic apparatus can become both the service provider apparatus and the service using apparatus with respect to the SEND service as illustrated in FIG. 10, the electronic apparatus may determine whether to change the service state information in the NFC tag 210*a* according to the service to be carried out as described above. Further, in a case where the service that the electronic apparatus itself provides and the instructed service (the service instructed by the opponent apparatus) can be carried out at the same time without impairing the user's usability, the electronic apparatus itself may operate without changing the service state information about the service that this electronic apparatus itself provides.

Exemplary embodiments have been described in detail. However, the above-described exemplary embodiments merely discuss an example of how aspects of the present invention can be exploited. The technical scope of aspects of the present invention is not limited to the above-described exemplary embodiments. Aspects of the present invention can be modified in various manners within a range that does not depart from the spirit of the aspects of the present invention, and such modifications are also included in the technical scope of the aspects of the present invention.

For example, the communication apparatus 101 according to the above-described exemplary embodiments stores the information indicating that the service cannot be provided in the NFC tag 210*a* to notify the opponent apparatus that this service is unusable. However, the communication apparatus 101 may stop the function of the NFC tag 210*a* with use of the NFC control unit 111. The communication apparatus 101 can stop the function of the NFC tag 210*a* by, for example, causing the NFC control unit 111 to disable the NFC antenna control unit 112 and/or the NFC antenna 113. When the function of the NFC tag 210*a* is stopped, since the information about this service cannot be obtained, the processing for carrying out the service that is performed by the opponent apparatus ends in an error.

Further, the communication apparatus 101 may cause the processing for carrying out the service that is performed by the opponent apparatus to end in an error by refraining from storing the information required to carry out the service such as the service state information, in the service information that the opponent apparatus acquires via the NFC communication. Alternatively, the communication apparatus 101 may cause the processing for carrying out the service performed by the opponent apparatus to end in an error by storing an error value as the service state information. The communication apparatus 101 can prevent the service unintended by the user from being carried out since the processing for carrying out the service performed by the opponent apparatus ends in the error.

Further, in the above-described exemplary embodiments, the service state information is changed to "provision possible" when the WFD connection has ended. However, the service state information may be changed to "provision possible" when the communication of the service has completed.

Further, aspects of the present invention do not assume the use of the Wi-Fi Direct communication and the NFC communication, and can be applied to other communication methods as appropriate.

In other words, even in a case where the communication apparatus 101 detects the service provider apparatus and performs the communication of the service by another communication method than the above-described communication methods, the above-described exemplary embodiments can prevent the service unintended by the user of the communication apparatus 101 from being carried out, and improve the usability.

The above-described exemplary embodiments have been described based on the example using the wireless LAN communication, but aspects of the present invention are not limited to this example. For example, the above-described exemplary embodiments can be also applied to Bluetooth communication and Ethernet communication. Further, the above-described exemplary embodiments can be also applied not only to wireless communication, but also to wired communication.

Further, the above-described exemplary embodiments have been described based on the example in which the communication apparatus is the digital camera and the smartphone as one example, but the communication apparatus may be another apparatus such as a personal computer (PC), a printer, a multi-functional peripheral, and a digital home appliance. Further, the service provided or used by each of the communication apparatuses is not limited to the SEND service and the PLAY service, and may be another service such as the print service, or a display service for presenting a moving image.

The components described as hardware devices in the above description may be partially or entirely realized by software components, and the component described as software in the above description may be partially or entirely realized by hardware devices.

Other Embodiments

Additional embodiments can also be realized by a computer of a system or apparatus that reads out and executes computer executable instructions recorded on a storage medium (e.g., non-transitory computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-215136, filed Oct. 22, 2014, which is hereby incorporated by reference herein in its entirety.

What is claimed is:

1. A communication apparatus comprising:
an acquisition unit configured to acquire, from another communication apparatus, first service information containing an identifier for identifying a first service that the another communication apparatus can provide, wherein the another communication apparatus operates as a service provider apparatus and the communication apparatus operates as a service using apparatus in the first service;
a storage unit configured to store second service information containing an identifier for identifying a second service and state information indicating whether the communication apparatus is capable of providing the second service, the second service information being information to be acquired by the another communication apparatus, wherein the communication apparatus operates as a service provider apparatus and the another communication apparatus operates as a service using apparatus in the second service;
a communication control unit configured to establish a connection for data communication between the communication apparatus and the another communication apparatus for carrying out the first service or the second service; and
a setting unit configured to set the state information stored by the storage unit so that the state information indicates that the communication apparatus is incapable of providing the second service in response to reception of an instruction to carry out the first service.

2. The communication apparatus according to claim 1, wherein the setting unit sets the state information stored by the storage unit, after data communication starts with the another communication apparatus, so that the state information indicates that the communication apparatus is capable of providing the second service.

3. The communication apparatus according to claim 1, wherein the setting unit sets the state information stored by the storage unit, after data communication with the another communication apparatus ends, so that the state information indicates that the communication apparatus is capable of providing the second service.

4. The communication apparatus according to claim 1, wherein the setting unit sets the state information stored by the storage unit so that the state information indicates that the communication apparatus is capable of providing the second service after a predetermined time period has elapsed since the first service information is acquired by the acquisition unit.

5. The communication apparatus according to claim 1, wherein the setting unit sets the state information stored by the storage unit so that the state information indicates that the communication apparatus is capable of providing the second service, in at least any of a case where the first service identified by the identifier contained in the first service information acquired from the another communication apparatus is unusable, a case where the first service information cannot be acquired from the another communication apparatus, and a case where an error occurs in data communication between the communication apparatus and the another communication apparatus.

6. The communication apparatus according to claim 1, wherein the acquisition of the first service information by the acquisition unit is performed via a connection based on a first communication method, and the data communication with the another communication apparatus is performed via a connection based on a second communication method different from the first communication method.

7. The communication apparatus according to claim 6, wherein the first communication method is a close proximity wireless communication method.

8. The communication apparatus according to claim 6, wherein the second communication method is a wireless LAN communication method complying with the IEEE 802.11 series.

9. The communication apparatus according to claim 1, further comprising a determination unit configured to determine whether the first service and the second service can be carried out at a same time,
wherein, in a case where the determination unit determines that the first service and the second service can be carried out at the same time, the setting unit does not set the state information stored by the storage unit so that the state information indicates that the communication apparatus is incapable of providing the second service.

10. The communication apparatus according to claim 1, wherein, before the communication control unit establishes the connection for data communication between the communication apparatus and the another communication apparatus, the setting unit sets the state information stored by the storage unit so that the state information indicates that the communication apparatus is incapable of providing the second service.

11. The communication apparatus according to claim 1, wherein the acquisition unit acquires the first service information from the another communication apparatus after the setting unit sets the state information stored by the storage unit so that the state information indicates that the communication apparatus is incapable of providing the second service.

12. The communication apparatus according to claim 1, wherein each of the first service and the second service is either a function of transferring a still image or a function of transferring a moving image.

13. A method for controlling a communication apparatus, the method comprising:
acquiring, from another communication apparatus, first service information containing an identifier for identifying a first service that the another communication apparatus can provide, wherein the another communication apparatus operates as a service provider apparatus and the communication apparatus operates as a service using apparatus in the first service;
storing second service information containing an identifier for identifying a second service and state information indicating whether the communication apparatus is capable of providing the second service, the second service information being information to be acquired by the another communication apparatus, wherein the communication apparatus operates as a service provider apparatus and the another communication apparatus operates as a service using apparatus in the second service;
establishing a connection for data communication between the communication apparatus and the another communication apparatus for carrying out the first service or a second service that the communication apparatus can provide; and
setting state information about the second service so that the state information about the second service indicates that the communication apparatus is incapable of providing the second service in response to reception of an instruction to carry out the first service.

14. A non-transitory computer-readable storage medium storing computer executable instructions for causing a computer to execute a method for controlling a communication apparatus, the method comprising:
acquiring, from another communication apparatus, first service information containing an identifier for identifying a first service that the another communication apparatus can provide, wherein the another communication apparatus operates as a service provider apparatus and the communication apparatus operates as a service using apparatus in the first service;
storing second service information containing an identifier for identifying a second service and state information indicating whether the communication apparatus is capable of providing the second service, the second service information being information to be acquired by the another communication apparatus, wherein the communication apparatus operates as a service provider apparatus and the another communication apparatus operates as a service using apparatus in the second service;
establishing a connection for data communication between the communication apparatus and the another communication apparatus for carrying out the first service or a second service that the communication apparatus can provide; and
setting state information about the second service so that the state information about the second service indicates that the communication apparatus is incapable of providing the second service in response to reception of an instruction to carry out the first service.

* * * * *